United States Patent
Singh et al.

(10) Patent No.: US 8,149,332 B2
(45) Date of Patent: Apr. 3, 2012

(54) METHOD AND SYSTEM FOR USING A SUBSET OF RECEIVE OPERATIONS FOR DETECTING DIGITAL AND ANALOG TELEVISION SIGNALS

(75) Inventors: Mohit Singh, Irvine, CA (US); Thomas Spieker, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 1352 days.

(21) Appl. No.: 11/746,775

(22) Filed: May 10, 2007

(65) Prior Publication Data

US 2008/0278622 A1    Nov. 13, 2008

(51) Int. Cl.
H04N 5/46 (2006.01)
H04N 5/44 (2006.01)

(52) U.S. Cl. ............... 348/558; 348/725; 348/731

(58) Field of Classification Search .......... 348/554–556, 348/558, 725, 731–733; H04N 5/46, 5/44, H04N 5/50
See application file for complete search history.

(56) References Cited

U.S. PATENT DOCUMENTS

| 7,936,402 B2* | 5/2011 | Choi | 348/554 |
| 2004/0218094 A1* | 11/2004 | Choi | 348/558 |
| 2005/0134747 A1* | 6/2005 | Seo | 348/554 |
| 2005/0179818 A1* | 8/2005 | Wong et al. | 348/558 |

* cited by examiner

Primary Examiner — Sherrie Hsia
(74) Attorney, Agent, or Firm — Thomas, Kayden, Horstemeyer & Risley, LLP

(57) ABSTRACT

Aspects of a method and system for processing signals in a television system using a subset of receive operations for detecting digital and analog television signals are provided. The system and method may be deployed in, for example, cable TV set-top boxes, cable TV modems, and television receivers, which may be coupled to a cable TV or over-the-air terrestrial network. Performing only a subset of receiver operations may allow detection of the type of signal; for example digital QAM, digital VSB, or analog; present in a television channel. In this regard, it is not necessary to generate and validate a bit stream in order to detect if a signal is present and/or the type of signal present.

30 Claims, 9 Drawing Sheets

METHOD AND SYSTEM FOR USING A SUBSET OF RECEIVE OPERATIONS FOR DETECTING DIGITAL AND ANALOG TELEVISION SIGNALS

CROSS-REFERENCE TO RELATED APPLICATIONS/INCORPORATION BY REFERENCE

Not Applicable

FIELD OF THE INVENTION

Certain embodiments of the invention relate to the processing of television (TV) signals. More specifically, certain embodiments of the invention relate to a method and system for using a subset of receive operations for detecting digital and analog television signals.

BACKGROUND OF THE INVENTION

Television (TV) networks have traditionally utilized analog signal formats to carry video and audio channels to television viewers or subscribers. All the television signals may each be modulated at a different radio frequency (RF) and combined or multiplexed for transmission over the terrestrial air or a hybrid fiber-coaxial cable network. The customer premise equipment (CPE), such as a TV set or cable set-top box converter, receives all such signals combined, and tunes to a particular frequency in order to display the TV channel desired by the viewer.

With various advancements in digital communications and the introduction of digital television (DTV), TV network providers have been replacing or otherwise upgrading their transmission and distribution systems to provide new and/or better quality services to their viewers or paid subscribers. In addition to transmitting analog signals, the infrastructure of these upgraded or new systems are also adapted to facilitate the generation and transmission of various digital formats that provide superior picture and sound quality, higher channel capacity, high-speed Internet data services, voice services and/or interactive services. Given the size of existing television infrastructure, television network providers must also provide support for legacy systems, and therefore, provide support for both analog and digital television systems.

Since a plurality of analog and/or digital channels are multiplexed onto and transmitted by the TV network provider infrastructure, the CPE may have the capability to determine whether a channel may comprise an analog or digital signal and also determine the modulation and/or coding scheme used. In the absence of a quick way to determine the signal format, the CPE may have to try to demodulate and decode every possible modulation and coding scheme which may be time consuming.

Current analog TV signals are defined primarily by the National Television Standards Committee (NTSC), the Phase Alternative Line (PAL) or the Sequential Couleur Avec Memoire (SECAM) systems, and used in different countries around the world. An analog TV signal utilizes at least two RF carriers, combined in the same channel band. In this regard, a first carrier may commonly be amplitude modulated (AM) with video content, while one or more other carriers may be frequency modulated (FM), amplitude modulated (AM), or quaternary phase-shift keyed (QPSK) with audio content. An analog TV receiver functions by performing a series of operations comprising adjusting the signal power, separating the video and audio carriers, and demodulating each carrier in order to down-convert the signals to baseband. The baseband video signal may then be decoded and displayed by achieving horizontal and vertical synchronization and extracting the luminance and color information. After demodulating the received signal, the resulting baseband audio may be decoded, and left, right, surround channels and/or other information may be extracted.

Current digital TV signals utilize a plurality of modulation techniques for transmitting and receiving packetized information comprising one or more digitized and compressed TV programs, Internet data and/or voice data. Current digital TV standards in the U.S. define the use of quadrature amplitude modulation (QAM) of different levels including quaternary phase shift keying (QPSK), 16-QAM, 32-QAM, 64-QAM, 128-QAM, 256-QAM, 512-QAM, and 1024-QAM for digital cable transmission. Additionally, current digital TV standards in the U.S. define the use of vestigial sideband (VSB) modulation including 2-VSB, 4-VSB, 8-VSB, 16-VSB for terrestrial digital transmission among other schemes. Similarly, DVB and ISDB are other standards used for cable and terrestrial digital transmission in various countries around the world. A QAM or VSB receiver functions by performing a series of operations comprising adjusting the signal power, locking to the carrier, and down-converting to baseband. The baseband digital signal may be demodulated by trying a series of schemes, and processing may include error correction and decompression to reproduce the picture and sound, or processed as internet or voice data.

In a conventional TV CPE, after tuning to a channel frequency, the TV set or set-top box normally detects whether or not a channel comprises an analog or digital signal, or any signal at all, by performing the all of receive functions outlined above. If the receiver successfully creates and validates a bit stream from the RF carrier using a QAM scheme, for example, then a QAM signal has been detected. If the receiver successfully creates and validates a bit stream from the RF carrier using a VSB scheme, for example, then a VSB signal has been detected. If a receiver successfully locks to the video and audio carriers of an analog signal, then an analog, NTSC for example, TV signal has been detected. Otherwise the receiver found no signal at all.

One example of problems presented by slow detection of TV signals is when a receiver is connected to a cable or over-the-air terrestrial network and performs a scan of the television channels to detect and possibly store the type of signal present on each channel. Slow detection of the signal on a TV channel is increasingly problematic as advances in digital communications and introduction of digital television have led to an increasing number of television channels and thus an increasing amount of time required to complete a scan of the channels.

In a cable modem used for receiving Internet data, the cable modem receiver must detect only digital QAM signals. When a cable modem has to wait until a valid bit stream is created for each detection attempt, the usual latency associated with a connection increases. Furthermore, the latency due to the waiting process is further exacerbated when the modem has to scan all the available RF channels in order to detect which RF channel comprises the appropriate Internet information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for using a subset of receive operations for detecting digital and analog TV signals substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using a subset of receive operations for detecting digital and analog TV signals. In this regard, a format of a television signal may be detected in a faster and more efficient manner than conventional systems. Accordingly, aspects of the invention may be useful whenever there is a possibility of a presence of more than one type of signal on a television channel. The system and method may be adapted for or deployed in customer premise equipment (CPE), for example, television sets, cable TV set-top boxes, cable television modems, hand-held AV, PDA or cell phone devices and television set receivers, which may be coupled to a cable TV or over-the-air terrestrial network. In this regard, aspects of the invention may be utilized in existing receiver hardware and/or existing receivers may require little or no additional hardware for implementation. The speed and efficiency of the various embodiments of the invention may, for example, allow faster scanning of one or more television channels upon coupling a CPE to a cable TV or over-the-air terrestrial network.

Information from one or more receiver operations may be utilized to detect whether a TV channel comprises a digital or an analog television signal. In this regard, it is not necessary to perform a complete receive function, generating and validating a bit stream from the TV channel, before a determination can be made as to format, three examples being QAM, VSB, and NTSC, of the television signal. Therefore the process of detecting the format of a television signal is shortened and simplified. Aspects of the invention may use information from one or more receiver operations to detect a mode, two examples being 4-QAM and 8VSB, of a digital television signal. In this regard, it is not necessary to perform a complete receive function, generating and validating a bit stream from the TV channel, before a determination can be made as to the mode of the digital television signal. Therefore the process of detecting the mode of the digital television signal is shortened and simplified.

Figure 1:
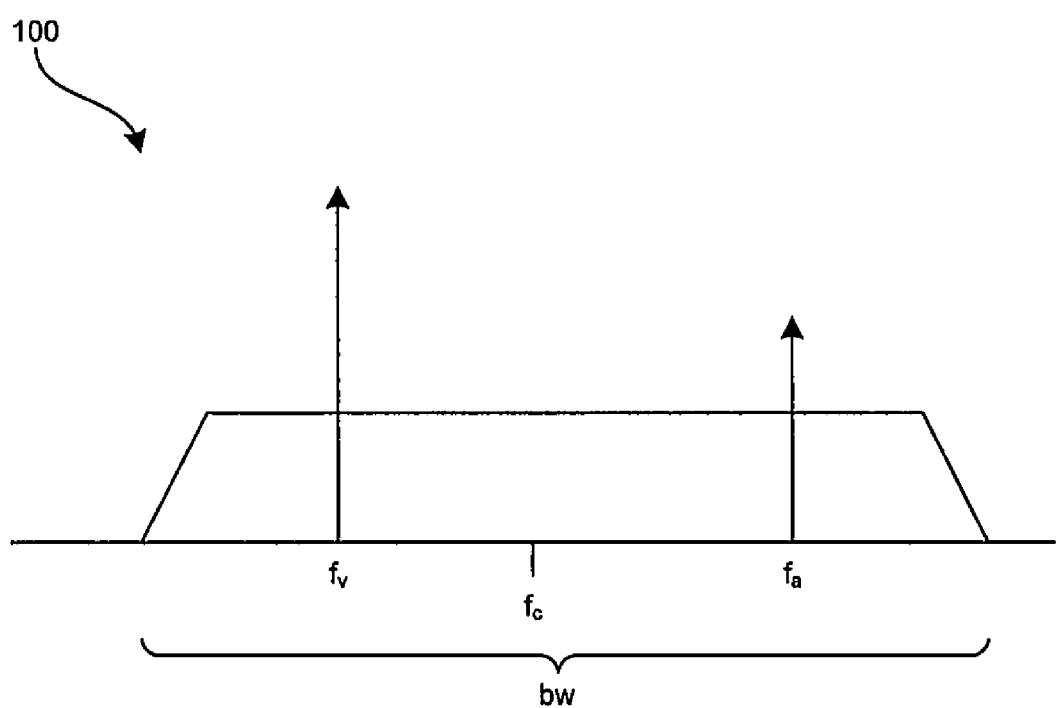
FIG. 1 is a diagram of the RF spectrum of an analog TV signal, which may be utilized in connection with detecting digital quadrature amplitude modulation (QAM), digital vestigial sideband (VSB) modulation, or analog television signals in a television channel, in accordance with an embodiment of the invention.

FIG. 1 is a diagram of the RF spectrum 100 of an analog TV signal, which may be utilized in connection with detecting analog television signals in a television channel, in accordance with an embodiment of the invention. Referring to FIG. 1, there is shown video carrier $f_v$, center frequency $f_c$ and audio carrier $f_a$. The video carrier may be located at frequency $f_v$ and the audio carrier may be located at frequency $f_a$. The video carrier $f_v$ and audio carrier $f_a$ are distinguishable as the left and right peaks, respectively, even though they may be modulated with picture, sound and/or other information. In a NTSC broadcast system, for example, the entire analog TV signal of FIG. 1 may occupy 6 MHz of bandwidth (bw). The video carrier ($f_v$) may be −1.75 MHz to the left of the center frequency ($f_c$) of the channel, and the audio carrier ($f_a$) may be +2.75 MHz to the right of the center of the channel. In a PAL broadcast system, for example, the entire analog TV signal may occupy 8 MHz of bandwidth. In this case, the video carrier may be −2.75 MHz to the left of the center of the channel, and the audio carrier may be +2.75 MHz to the right of the center of the channel. Although the NTSC signal occupies a 6 MHz of bandwidth and the PAL signal occupies a bandwidth of 8 MHz, the invention is not limited in this regard. Accordingly, the invention may be applicable to other signals bearing different bandwidth configurations, which may, for example, be utilized in other countries and/or in the future.

Figure 2A:
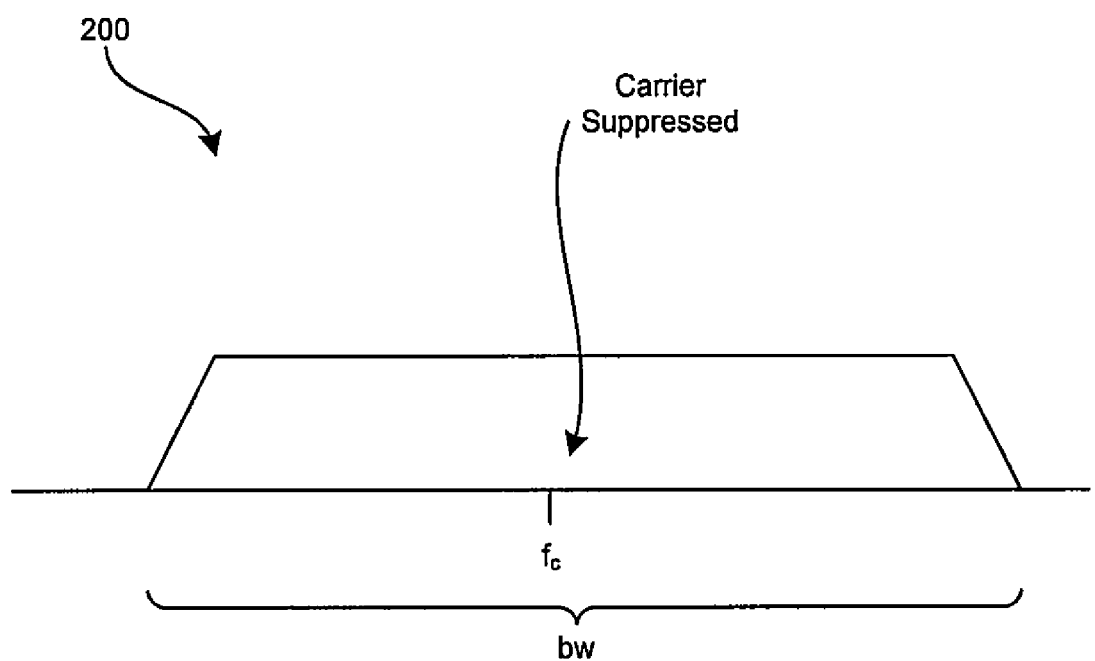
FIG. 2a is a diagram of the RF spectrum of a digital QAM signal, which may be utilized in connection with detecting digital quadrature amplitude modulation (QAM), digital vestigial sideband (VSB) modulation, and analog television signals, in accordance with an embodiment of the invention.

FIG. 2a is a diagram of the RF spectrum 200 of a digital QAM signal, which may be utilized in connection with detecting digital quadrature amplitude modulation (QAM) television signals, in accordance with an embodiment of the invention. The single carrier is in the center (fc) of the channel but it is suppressed. In the NTSC system, the entire signal occupies 6 MHz of bandwidth (bw), and in the PAL system, 8 MHz.

Figure 2B:
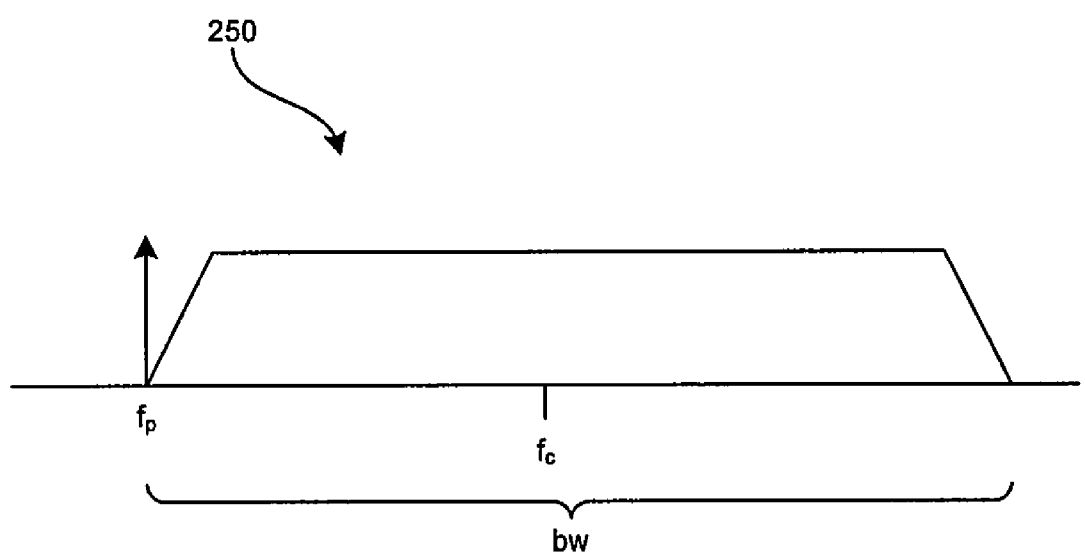
FIG. 2b is a diagram of the RF spectrum of a digital VSB signal, which may be utilized in connection with detecting digital quadrature amplitude modulation (QAM), digital vestigial sideband (VSB) modulation, and analog television signals, in accordance with an embodiment of the invention.

FIG. 2b is a diagram of the RF spectrum 250 of a digital VSB signal, which may be utilized in connection with detecting digital vestigial sideband (VSB) modulation television signals, in accordance with an embodiment of the invention. The main carrier is in the center (fc) of the channel but it is suppressed. The pilot tone may be located at frequency $f_p$, near the edge of the spectrum. In the NTSC system, the entire signal occupies 6 MHz of bandwidth (bw), and in the PAL system, 8 MHz.

Figure 3:
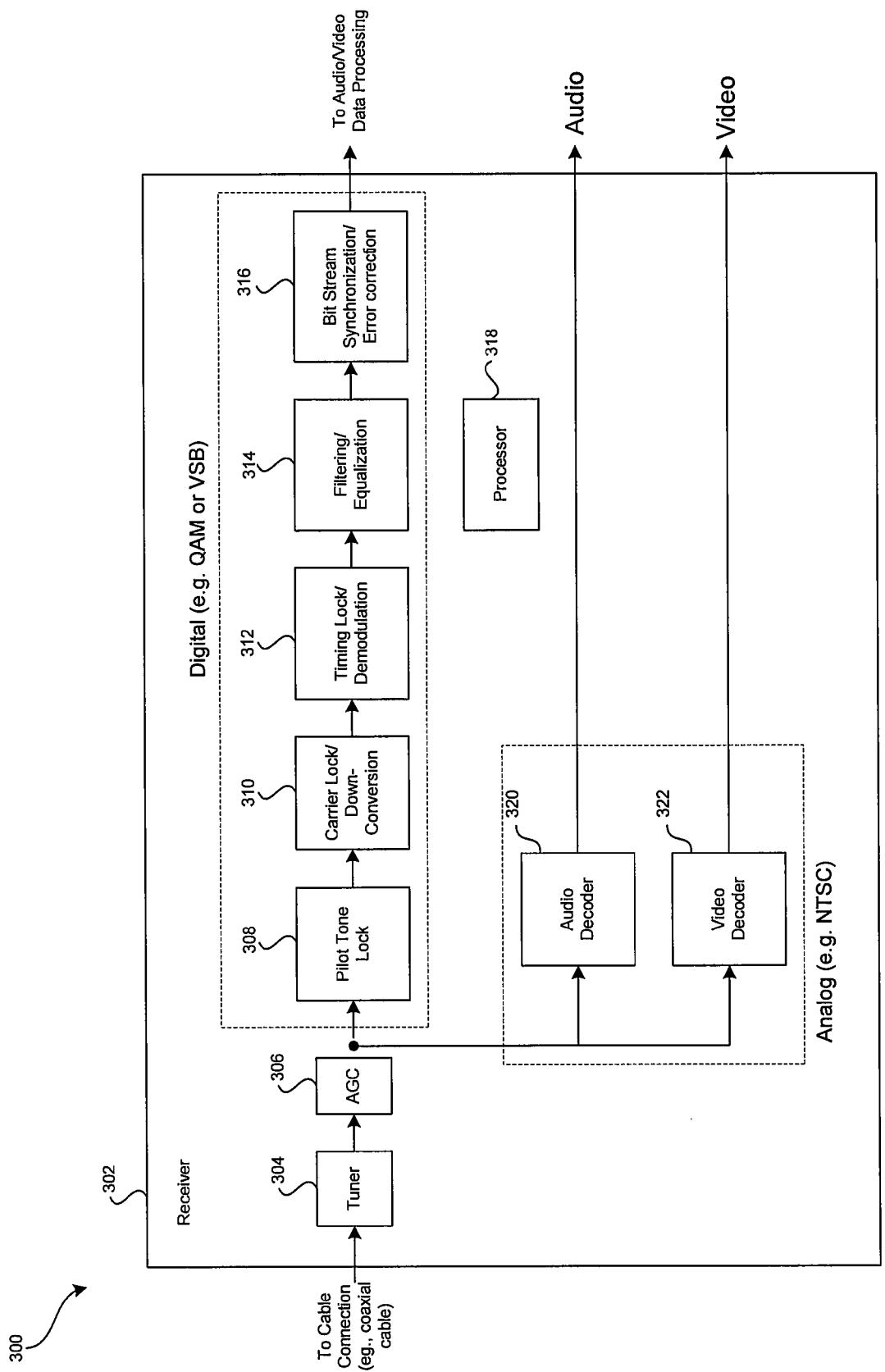
FIG. 3 is a block diagram of a receiver, which may be utilized in connection with detecting digital quadrature amplitude modulation (QAM), digital vestigial sideband (VSB) modulation, and analog television signals, in accordance with an embodiment of the invention.

FIG. 3 is a block diagram 300 of a receiver 302, which may be utilized in connection with detecting digital quadrature amplitude modulation (QAM), digital vestigial sideband (VSB) modulation, and analog television signals, in accordance with an embodiment of the invention. Referring to FIG. 3, there is shown a tuner block 304, an automatic gain control (AGC) block 306, a pilot tone lock block 308, a carrier lock/down-conversion block 310, a timing lock/demodulation block 312, a filtering/equalization block 314, a bit stream synchronization/error correction block 316, an analog audio decoder block 320, an analog video decoder block 322, and a processor 318. The tuner block 304 output signal is provided as an input to the AGC block and the error correction/bit stream synchronization block generates output video, audio and/or data signals for processing.

The tuner block 304 may comprise suitable logic, circuitry and/or code that may be adapted to pass signals in a desired frequency range and reject signals which are out of the desired frequency range. Accordingly, the tuner block 304 may comprise one or more passband filters for passing signals in the desired range and rejecting signals outside of the desired range. The tuner may be connected directly to, for example, a cable television wall outlet via, for example, a coaxial cable, or an over-the-air terrestrial television antenna.

The automatic gain control block 306 may comprise suitable logic, circuitry and/or code that may be adapted to adjust the signal power coming from the output of the tuner block 304.

The analog audio decoder block 322 menu comprise suitable circuitry, logic, and/or code that may enable the receiver 302 to lock to an audio carrier comprising a television signal and may enable down-converting and/or demodulating the analog audio signal.

The analog video decoder block 324 menu comprise suitable circuitry, logic, and/or code that may enable the receiver 302 to lock to a video carrier, a horizontal synch signal, and/or a vertical sync signal comprising a television signal and may enable down-converting and/or demodulating the analog video signal.

The pilot tone lock block 308, may comprise suitable logic, circuitry and/or code that may be adapted to lock to a pilot tone present in a signal received from the AGC block 306.

The carrier lock/down-conversion block 310, may comprise suitable logic, circuitry and/or code that may be adapted to down-convert and lock to the carrier of a signal received from the pilot tone lock block 308.

The timing lock/demodulation block 312, may comprise suitable logic, circuitry and/or code that may be adapted to demodulate and lock to the timing of a signal that may be received from the carrier lock/down-conversion block 310.

The filtering/equalization block 314, may comprise suitable logic, circuitry and/or code that may be adapted to filter and equalize a demodulated signal in order to mitigate amplitude and phase distortion which may occur during transmission over the air or from a cable distribution plant. The filtering/equalization block 314 may comprise a feed forward equalizer (FFE) and/or decision feedback equalizer (DFE) block, for example.

The bit stream synchronization/error correction block 316, may comprise suitable logic, circuitry and/or code that may be adapted to detect and correct any errors which may occur in a received bit stream. The error correction/bit stream synchronization block 316, may comprise, for example, a forward error correction (FEC) block.

The processor 318 may comprise suitable logic, circuitry, and/or code that may be adapted to control the tuner block 304, automatic gain control (AGC) block 306, audio decoder block 322, video decoder block 324, pilot tone lock block 308, down-conversion/carrier lock block 310, demodulation/timing block 312, filtering/equalization block 314, and/or error correction/bit stream synchronization block 316. In this regard, software may be utilized by the processor to handle or control the receiver 302.

In operation, after the tuner block 304 tunes to a particular television channel, the automatic gain control (AGC) block 306 may adjust a signal power coming from an output of the tuner block 304.

In the case of an analog television, after gain adjustment the analog audio decoder block 322 and/or the analog video decoder block 324 may lock to carriers and/or sync signals comprising the analog television signal and may down-convert and/or demodulate the television signal.

In the case of a digital television signal, after gain adjustment the pilot tone lock block 308 may lock to a pilot tone present in the signal, the carrier lock/down-conversion block 310 of the receiver 302 may lock to a carrier in order to down-convert the signal to baseband for proper signal demodulation. The filtering/equalization block 312 may be utilized to compensate for distortions and interference that may occur in the channel. The bit stream synchronization/error correction block 316 of receiver 302 may synchronize the data in order to produce a valid bit stream comprising video, audio and/or data for processing, and/or may correct any bit errors where possible.

In an embodiment of the invention the receiver 302 of FIG. 3, may be adapted to detect whether a channel comprises a digital signal such as the digital QAM signal of FIG. 2a or the digital VSB signal of FIG. 2b, or an analog signal such as the analog TV signal of FIG. 1, or no signal at all.

Referring to FIGS. 1, 2a, and 2b, it is noted that two carriers, $f_a$ and $f_v$, are present in the analog spectrum and absent from the QAM and VSB spectrums. Therefore, audio decoder block 322 and/or video decoder block 324 locking to carrier signals $f_a$ and $f_v$ may be utilized to detect that the TV channel comprises an analog TV signal. Inability of the audio decoder block 322 or video decoder block 324 to lock to carrier signals $f_a$ or fv may be utilized to detect that the TV channel does not comprise an analog TV signal.

Referring to FIGS. 1, 2a, and 2b, it is noted that a pilot tone is present in the VSB spectrum and absent from the QAM and analog spectrums. Therefore, pilot tone lock block 308 locking to a pilot tone may be utilized to detect that the TV channel comprises a VSB TV signal. Inability of the pilot tone lock block 308 to lock to a pilot tone may be utilized to detect that the TV channel does not comprise a VSB TV signal.

The carrier lock/down-conversion block 310 locking to a carrier at $f_c$ may be utilized to detect that the TV channel comprises a digital signal, two examples being QAM and VSB. In this regard, the carrier lock/down-conversion block 310 may be used to increase the confidence in a detection made by the pilot tone lock block 308. For example, locking to a pilot tone may be utilized to detect that a VSB signal is present and additionally locking to a carrier signal at $f_c$ may increase confidence in the detection of a VSB signal. Similarly, an inability to lock to a pilot tone may be utilized to detect that a QAM signal is present and additionally locking to a carrier at $f_c$ may increase confidence in the detection of a QAM signal.

In a similar manner, an ability of the timing lock/demodulation block 312 to lock to a symbol timing of a down converted signal from the carrier lock/down-conversion block 310 may be utilized to increase confidence in a detection of a digital format, for example QAM or VSB, made by the pilot block 308 and the carrier block 310. The timing lock/demodulation block 312 may enable distinguishing among different QAM modes or VSB modes. Exemplary QAM modes may comprise 4-QAM, 16QAM, 32QAM, 64QAM, 128QAM, 256QAM, 512QAM, 1024QAM, 2048QAM. Exemplary VSB modes may comprise 2-VSB, 4-VSB, 8-VSB, 16VSB. In this regard, cable transmissions in the U.S., for example, may use 5.056 Mbaud for 64QAM and 5.36 Mbaud for 256QAM. Accordingly, locking to a baud rate of 5.056 Mbaud, in this case, may indicate the presence of a 64QAM signal. Similarly, locking to a baud rate of 5.36 Mbaud, in this case, may indicate a 256QAM signal. Additionally, ability of the timing lock/demodulation block 312 to lock to sync pulses in a down-converted signal from the carrier lock/down-conversion block 310 may be utilized to detect and/or increase confidence in a detection of an analog signal.

The filtering/equalization block 314 may be utilized to increase confidence in detections made by one or more of the pilot tone lock block 308, the carrier lock/down-conversion block 310, and/or the timing lock/demodulation block 312. In this regard, convergence of the filtering/equalization block 314, when processing a demodulated signal from the timing lock/demodulation block 312, may decrease the probability of incorrectly detecting a non-QAM and non-VSB signal as being a QAM or a VSB signal. Failure of the filtering/equalization block 312 to converge may indicate that there is no valid QAM or VSB signal.

The bit stream synchronization/error correction block 316 may be utilized to detect the modulation scheme of a digital component in a TV channel. Synchronization to a Data Frame Synchronizing (DFS) signal output from filtering/equalization block 314 may be utilized detect and/or increase confidence that the TV channel comprises a VSB TV signal. Inability of the bit stream synchronization/error correction block 316 to lock to a DFS signal may be utilized to detect or increase confidence that the TV channel may not comprise a VSB TV signal. Synchronization to MPEG encoded data output from filtering/equalization block 314 may be utilized to detect or increase confidence that the TV channel comprises a digital TV signal. Accordingly, the bit stream synchronization/error correction block 316 may be used to increase the confidence in a detection made by one or more of the pilot tone lock block 308, the carrier lock/down-conversion block 310, the timing lock/demodulation block 312, and/or the filtering/equalization block 314.

A subset of the pilot tone lock block 308, the carrier lock/down-conversion block 310, the timing lock/demodulation block 312, the filtering/equalization block 314, and the bit stream synchronization/error correction block 316 may be used for detection of a television signal format. Accordingly, there may be a trade-off between time spent on detection and confidence in detection. In this manner, as a larger subset of the blocks comprising the receiver 302 are used for detecting a signal, the confidence in detection may increase as the time required for detection increases. For example, using just the AGC block 306, the pilot tone lock block 308 and the carrier lock/down conversion block 310 may provide a quick detection, while additionally using the timing lock/demodulation block 312 may provide detection with greater confidence and may additionally enabled detecting a mode of the signal.

Figure 4A:
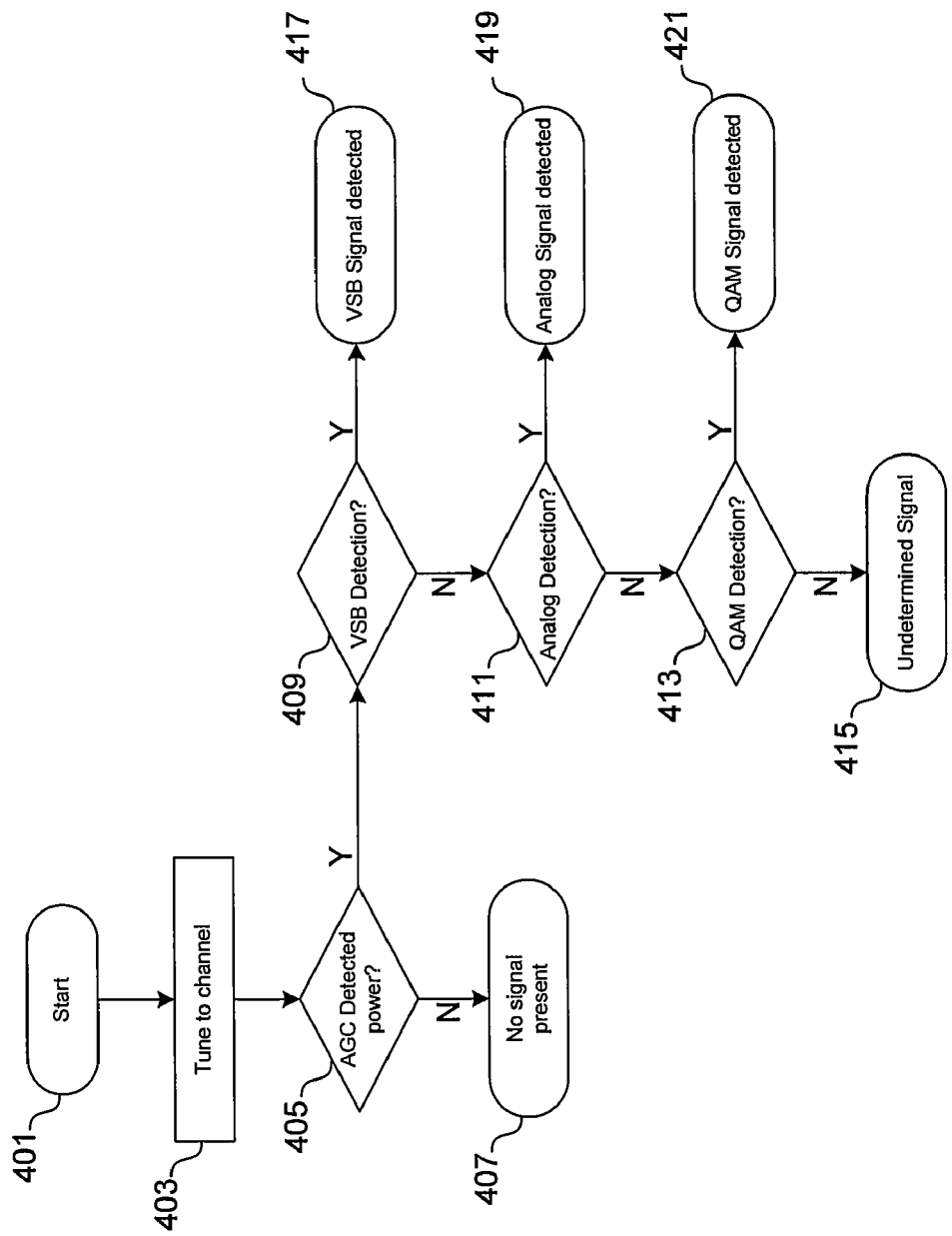
FIG. 4a is a flow chart illustrating exemplary steps that may be utilized for detecting digital quadrature amplitude modulation (QAM), digital vestigial sideband (VSB) modulation, and analog television signals, in accordance with an embodiment of the invention.

FIG. 4a is a flow chart illustrating exemplary steps that may be utilized for detecting digital quadrature amplitude modulation (QAM) signals, digital vestigial sideband (VSB) modulation signals, and analog television signals, in accordance with an embodiment of the invention. The exemplary steps illustrated in the algorithm may be implemented in software, hardware, or any combination thereof. Referring to FIG. 4, the exemplary steps may begin with start step 401. Subsequently, in step 403, the receiver may tune to a television channel. Next, in step 405, it may be determined whether the AGC indicates a signal may be present in the channel. In this regard, the AGC may, for example, be at a maximum value when no signal is present in the channel. If no valid signal is present in the channel, the exemplary steps may advance to step 407.

Returning to step 405, if the AGC indicates that there may be a signal present in the channel, the exemplary steps may advance to step 409. Step 409 attempts to detect if a VSB signal is present in the channel. If a VSB signal is detected, then the exemplary steps may advance to step 417.

Returning to step 409, if the VSB detection is unsuccessful, then the exemplary steps may advance step 411. Step 411 attempts to detect an analog signal present in the channel. If the analog signal detection is successful, the exemplary steps may advance to step 419.

Returning to step 411, if the analog signal detection is unsuccessful, the exemplary steps may advance step 413. Step 413 attempts to detect a QAM signal present in the channel. If the QAM detection is successful, the exemplary steps may advance to step 421.

Returning to step 413, if the QAM detection is unsuccessful, there may be no valid signal present in the channel and the exemplary steps may advance step 415.

Figure 4B:
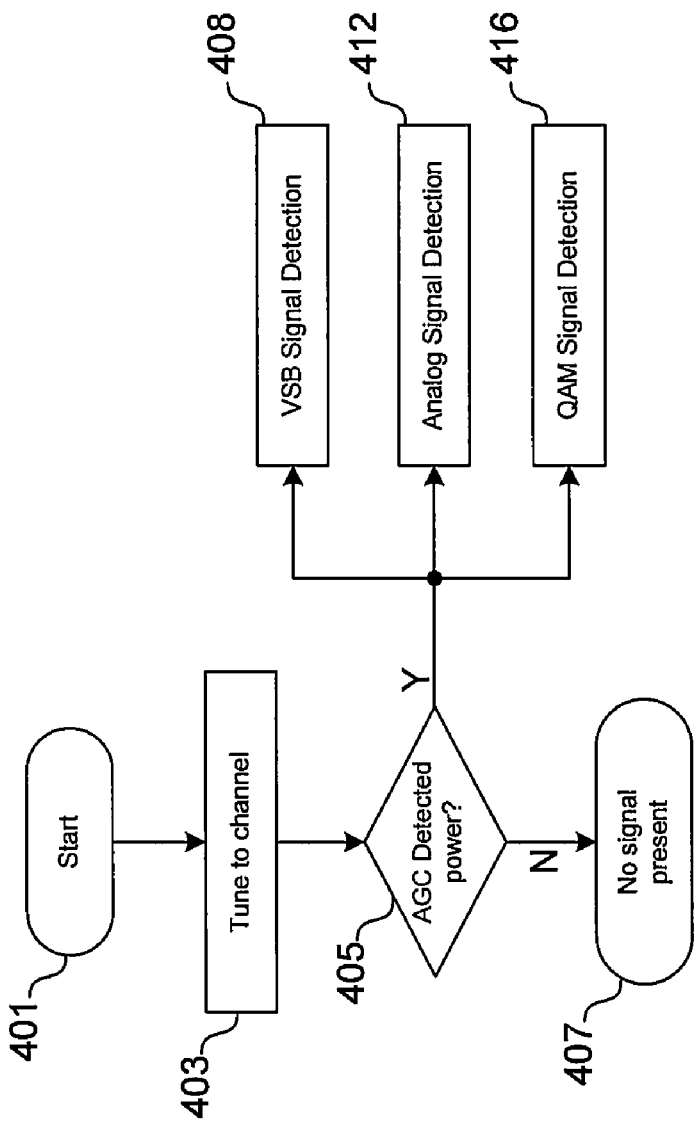
FIG. 4b is a flow chart illustrating exemplary steps that may be utilized for detecting digital quadrature amplitude modulation (QAM), digital vestigial sideband (VSB) modulation, and analog television signals, in accordance with an embodiment of the invention.

FIG. 4b is a flow chart illustrating exemplary steps that may be utilized for detecting digital quadrature amplitude modulation (QAM) signals, digital vestigial sideband (VSB) modulation signals, and analog television signals, in accordance with an embodiment of the invention. Referring to FIG. 4 the exemplary steps may begin with start step 401. Subsequently, in step 403, the receiver may tune to a television channel. Next, in step 405, it may be determined whether the AGC indicates that a signal may be present in the channel. In this regard, the AGC may, for example, be at a maximum value when no signal is present in the channel. If no valid signal is present in the channel, the exemplary steps may advance to step 407.

Returning to step 405, if the AGC indicates that there may be a signal present in the channel, the exemplary steps may advance to steps 408, 412, and/or 416. In this regard, detection of various types of television signals may be performed in parallel or sequentially in any order. The steps 408, 412, and 416 are described in greater detail in the following figures.

Figure 5:
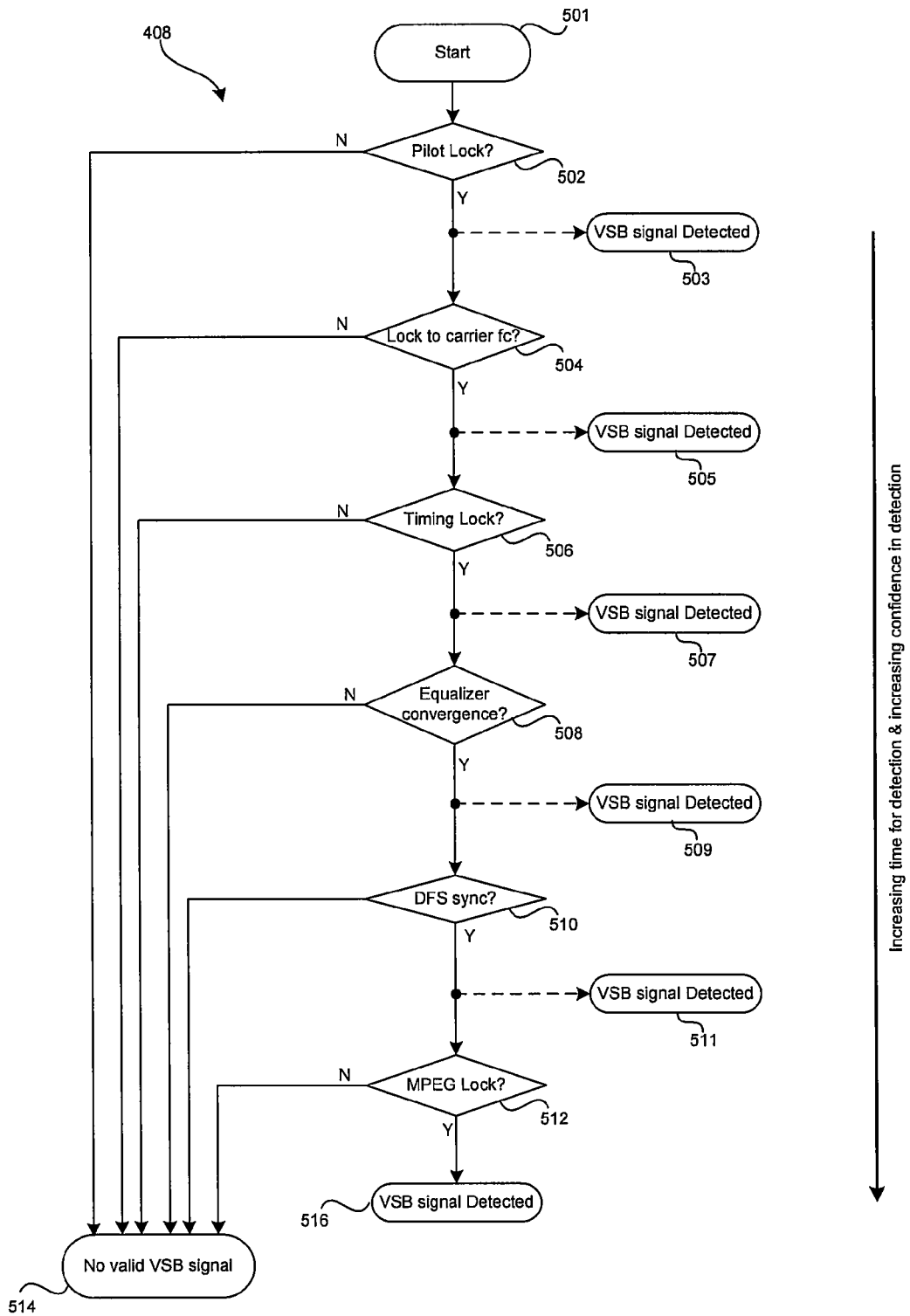
FIG. 5 is a flow chart illustrating exemplary steps that may be utilized for validating the detection of a VSB signal in a television channel, in accordance with an embodiment of the invention.

FIG. 5 is a flow chart illustrating exemplary steps that may be utilized, by a receiver such as the receiver 302 disclosed in FIG. 3, for example, for detecting (VSB) signals in accordance with an embodiment of the invention. The exemplary steps in FIG. 5 may begin with start step 501, and may proceed to step 502 where it may be determined whether the receiver is able to lock to a pilot tone present in a channel. If the pilot tone lock is unsuccessful, then the exemplary steps may advance to step 514.

Returning to step 502, if the pilot lock is successful, and pilot lock provides sufficient confidence, then a VSB signal may be detected and the exemplary steps may advance to step 503. However, if pilot lock does not provide sufficient confidence in detecting a VSB signal, then the exemplary steps may advance to step 504.

In step 504 it may be determined whether the receiver is able to lock to a carrier, $f_c$ as shown in FIG. 2b, present in the channel. If, in step 504, the receiver is not able to lock to a carrier, $f_c$, present in the channel, then the receiver may detect no valid VSB signal and the exemplary steps may advance to step 514.

Returning to step 504, if the receiver is able to lock to a carrier, $f_c$, and carrier lock provides sufficient confidence, then a VSB signal may be detected and the exemplary steps may advance to step 505. However, if carrier lock does not provide sufficient confidence in detecting a VSB signal, then the exemplary steps may advance to step 506.

In step 506 it may be determined whether the receiver is able to lock to the timing of a VSB signal. If, in step 506, the receiver is not able to lock to the timing of a VSB signal, then the receiver may detect no valid VSB signal and the exemplary steps may advance to step 514.

Returning to step 506, if the receiver is able to lock to the timing of a VSB signal, and timing lock provides sufficient confidence, then a VSB signal may be detected and the exemplary steps may advance to step 507. However, if timing lock does not provide sufficient confidence in detecting a VSB signal, then the exemplary steps may advance to step 508.

In step 508 it may be determined whether the receiver is able to achieve convergence of an equalization function. If, in step 508, the receiver is not able to achieve convergence of an equalization function, then the receiver may detect no valid VSB signal and the exemplary steps may advance to step 514.

Returning to step 508, if the receiver is able to achieve convergence of an equalization function, and equalizer convergence provides sufficient confidence, then a VSB signal may be detected and the exemplary steps may advance to step 509. However if equalizer convergence does not provide sufficient confidence in detecting a VSB signal, then the exemplary steps may advance to step 510.

In step 510 it may be determined whether the receiver is able to lock to a DFS signal. If, in step 510, the receiver is not able to lock to a DFS signal, then the receiver may detect no valid VSB signal and the exemplary steps may advance to step 514.

Returning to step 510, if the receiver is able to lock to a DFS signal, and DFS lock provides sufficient confidence, then a VSB signal may be detected and the exemplary steps may advance to step 511. However, if DFS lock does not provide sufficient confidence in detecting a VSB signal, then the exemplary steps may advance to step 512.

In step 512, it may be determined whether the receiver is able to lock to a MPEG encoded bit-stream. If, in step 512, the receiver is not able to lock to a MPEG encoded bit-stream, then the receiver may detect no valid VSB signal and the exemplary steps may advance to step 514.

Returning to step 512, if the receiver is able to lock to an MPEG encoded bit-stream, then a VSB signal may be detected with a low probability of false detection and the exemplary steps may advance to step 516.

In this manner, FIG. 5 illustrates that by requiring less confidence in detection, a time required for detection may decrease. Similarly, if more time may be allotted for detection, higher confidence in that detection may be achieved. Accordingly, a VSB detection made in step 502 may provide a quick result with a somewhat low probability for accurate detection, while a VSB detection made in step 512 may take longer but may provide a high probability of an accurate detection. The level of confidence, and hence the number of receive functions, required to detect a VSB signal may, for example, be pre-determined or dynamically determined by a processor such as the processor 318 of FIG. 3.

Figure 6:
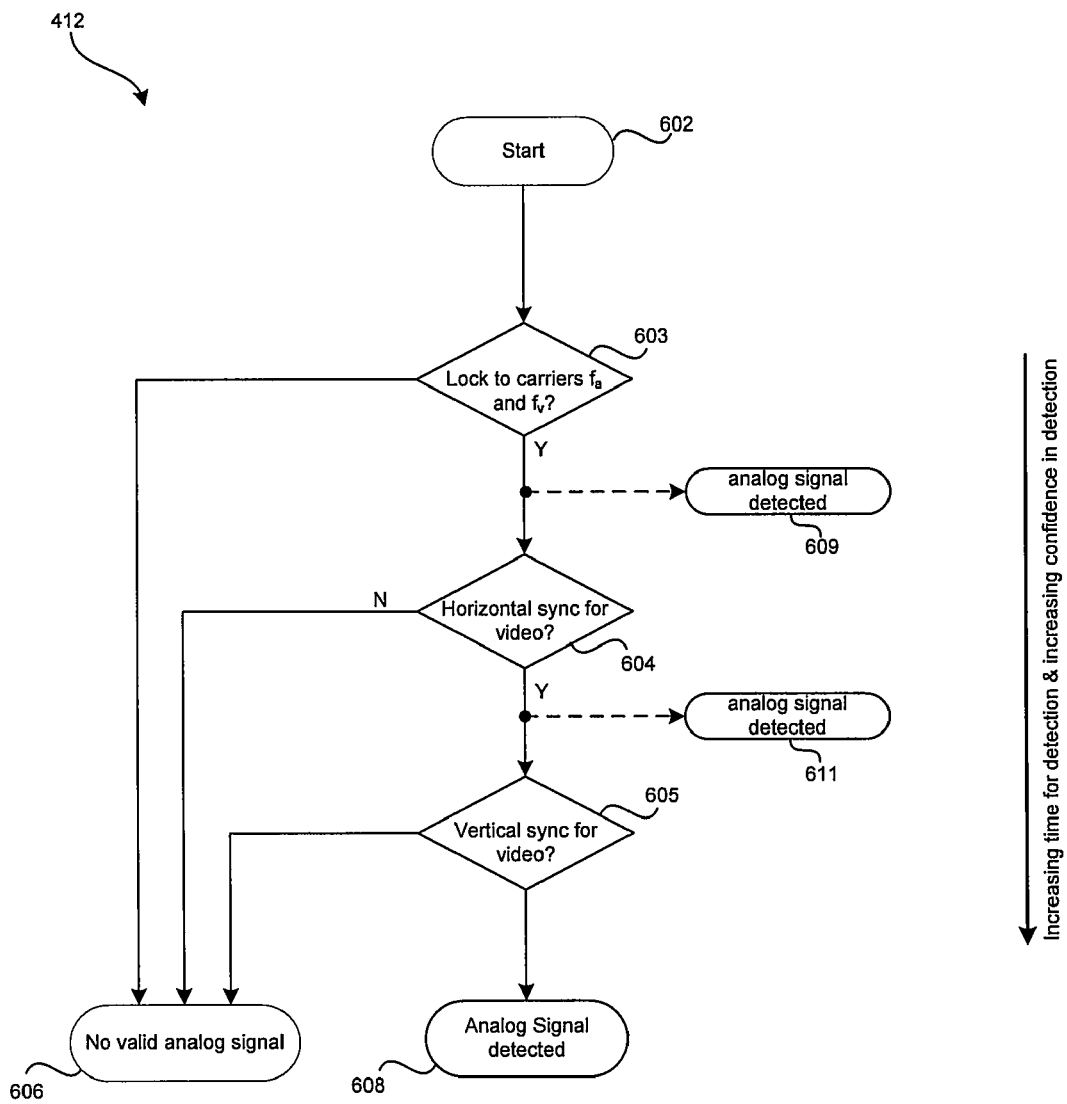
FIG. 6 is a flow chart illustrating exemplary steps that may be utilized for validating the detection of an analog signal in a television channel, in accordance with an embodiment of the invention.

FIG. 6 is a flow chart illustrating exemplary steps that may be utilized, by a receiver such as the receiver 302 disclosed in FIG. 3, for example, for detecting analog signals in accordance with an embodiment of the invention. The exemplary steps in FIG. 6 may begin with start step 602 and may proceed to step 603 where it may be determined whether a receiver is able to lock to carriers, such as the carriers $f_a$ and $f_v$ disclosed in FIG. 1. If the attempt to lock to $f_a$ and $f_v$ is unsuccessful, then the receiver may detect no valid analog signal and the exemplary steps may advance to step 606.

Returning to step 603 if the receiver successfully locks to $f_a$ and $f_v$, and carrier lock provides sufficient confidence, then an analog signal may be detected and the exemplary steps may advance to step 609. However, if carrier lock does not provide sufficient confidence for detecting an analog signal, then the exemplary steps may advance to step 604.

In step 604 it may be determined whether the receiver is able to lock to a horizontal sync signal present in the television channel. If the attempt to lock to the horizontal sync signal is unsuccessful, then the receiver may detect no valid analog signal and the exemplary steps may advance to step 606.

Returning to step 604 if the receiver successfully locks to a horizontal sync signal, and horizontal sync lock provides sufficient confidence, then an analog signal may be detected and the exemplary steps may advance to step 611. However, if horizontal sync lock does not provide sufficient confidence for detecting an analog signal, then the exemplary steps may advance to step 605.

In step 605 it may be determined whether the receiver is able to lock to a vertical sync signal present in the television channel. If the attempt to lock to the vertical sync signal is unsuccessful, then the receiver may detect no valid analog signal and the exemplary steps may advance to step 606.

Returning to step 605 if the receiver successfully lock to the vertical sync signal, then an analog signal may be detected with a low probability of false detection and the exemplary steps may advance to step 608.

In this manner, FIG. 6 illustrates that by requiring less confidence in detection, a time required for detection may decrease. Similarly, if more time may be allotted for detection, higher confidence in that detection may be achieved. Accordingly, an analog signal detection made in step 603 may provide a quick result with a somewhat low probability for accurate detection, while an analog signal detection made in step 605 may take longer but may provide a high probability of an accurate detection. The level of confidence, and hence the number of receive functions, required to detect an analog signal may, for example, be pre-determined or dynamically determined by a processor such as the processor 318 of FIG. 3.

Figure 7:
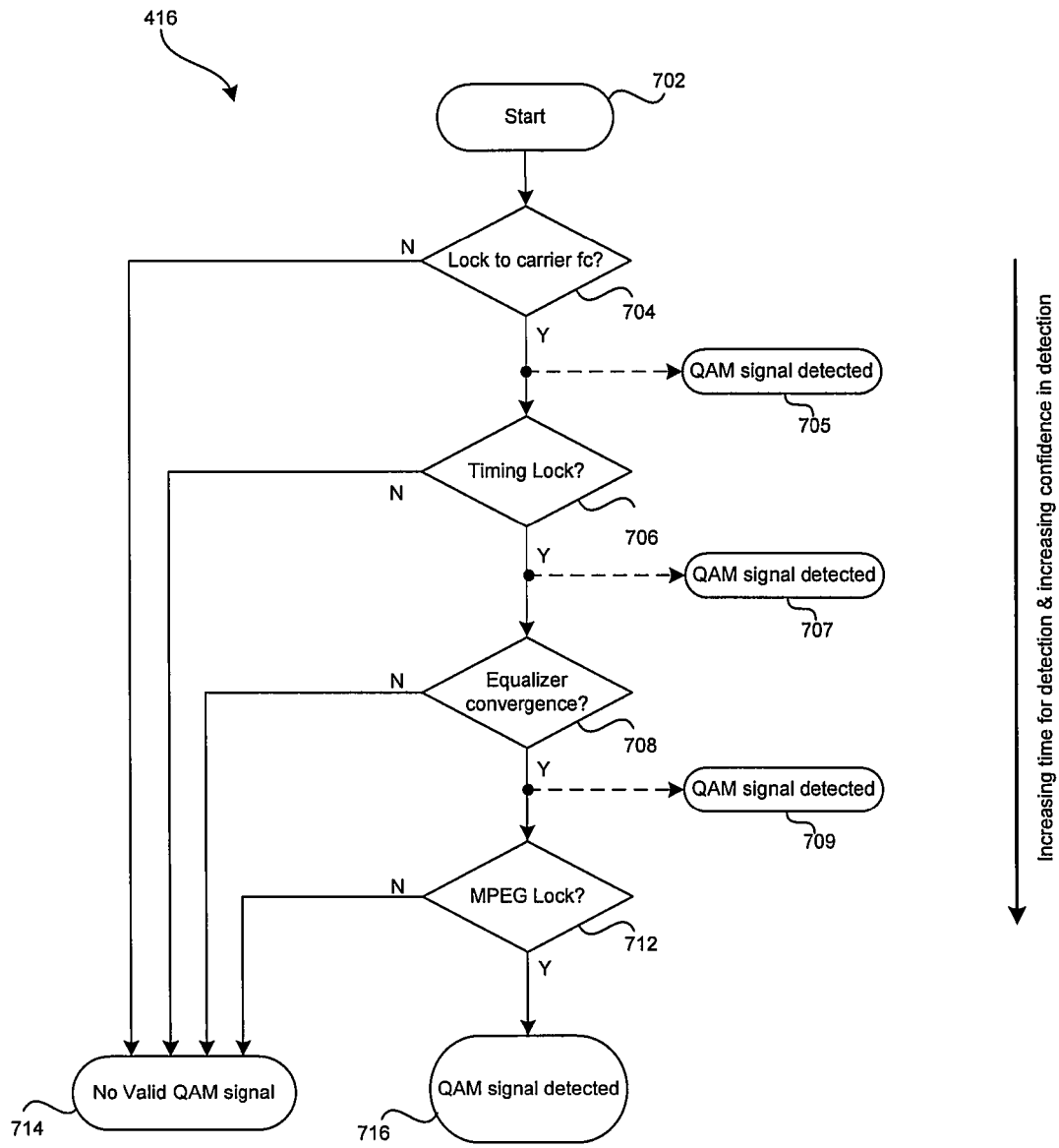
FIG. 7 is a flow chart illustrating exemplary steps that may be utilized for validating the detection of a QAM signal in a television channel, in accordance with an embodiment of the invention.

FIG. 7 is a flow chart illustrating exemplary steps that may be utilized by a receiver such as the receiver 302 disclosed in FIG. 3, for example, for detecting QAM signals in accordance with an embodiment of the invention. The exemplary steps in FIG. 7 may begin with start step 702 and may advance to step 704 where it may be determined whether the receiver is able to lock to a carrier, $f_c$ as shown in FIG. 2a, present in the channel. If, in step 704, the receiver is not able to lock to a carrier, $f_c$, present in the channel, then the receiver may detect no valid QAM signal and the exemplary steps may advance to step 714.

Returning to step 704, if the receiver is able to lock to a carrier, $f_c$, present in the channel, and carrier lock provides sufficient confidence, then a QAM signal may be detected and the exemplary steps may advance to step 705. However, if carrier lock does not provide sufficient confidence for detecting a QAM signal, then the exemplary steps may proceed to step 706.

In step 706 it may be determined whether the receiver is able to lock to the timing of a QAM signal. This step might also determine which QAM mode is present if there are multiple possible QAM modes with different symbol rates. If, in step 706, the receiver is not able to lock to the timing of a QAM signal, then the receiver may detect no valid QAM signal and the exemplary steps may advance to step 714.

Returning to step 706, if the receiver is able to lock to the timing of a QAM signal, and timing lock provides sufficient confidence, then a QAM signal may be detected and the exemplary steps may advance to step 707. However, if timing lock does not provide sufficient confidence for detecting an QAM signal, then the exemplary steps may proceed to step 708.

In step 708, it may be determined whether the receiver is able to achieve convergence of an equalization function. If, in step 708, the receiver is not able to achieve convergence of an equalization function, then the receiver may detect no valid QAM signal and the exemplary steps may advance to step 714.

Returning to step 708, if the receiver is able to achieve convergence of an equalization function, and equalizer convergence provides sufficient confidence, then a QAM signal may be detected and the exemplary steps may advance to step 709. However, if equalizer convergence does not provide sufficient confidence for detecting a QAM signal, then the exemplary steps may proceed to step 712.

In step 712 it may be determined whether the receiver is able to lock to a MPEG encoded bit-stream. If, in step 712, the receiver is not able to lock to a MPEG encoded bit-stream, then, the receiver may detect no valid QAM signal and the exemplary steps may advance to step 714.

Returning to step 712, if the receiver is able to lock to an MPEG encoded bit-stream, then, a QAM signal may be detected with a low probability of false detection and the exemplary steps may advance to step 716.

In this manner, FIG. 7 illustrates that by requiring less confidence in detection, a time required for detection may decrease. Similarly, if more time may be allotted for detection, higher confidence in that detection may be achieved. Accordingly, an QAM signal detection made in step 603 may provide a quick result with a somewhat low probability for accurate detection, while a QAM signal detection made in step 605 may take longer but may provide a high probability of an accurate detection. The level of confidence, and hence the number of receive functions, required to detect a QAM signal may, for example, be pre-determined or dynamically determined by a processor such as the processor or 318 of FIG. 3.

One or more of the exemplary steps shown in FIGS. 4, 5, 6, and 7 may be performed in an iterative fashion in connection with scanning a number of television channels. One or more of the exemplary steps in FIGS. 4, 5, 6, and 7 may be omitted without departing from the scope of the present invention. The order of the exemplary steps in FIGS. 4, 5, 6, and 7 may be altered without departing from the scope of the present invention.

Aspects of a method and system for detecting a format one or more television signals comprising a television channel utilizing only a subset of receive operations are provided. In this regard, the receive operations may be performed by the blocks such as the receiver blocks comprising the receiver 302. Additionally, the formats may include analog signals as described in FIG. 1, QAM signals as described in FIG. 2A, and/or VSB signals as described in FIG. 2B. Aspects of the invention may enable determining the mode of a QAM or VSB signal and/or the scheme of the analog signal, for example NTSC, PAL, or SECAM. Moreover, performing an increasing number of receive operations may decrease the probability of an incorrect detection, as described in FIGS. 5, 6, and 7.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing TV signals, the method comprising:
   in a TV system that receives and processes TV signals,
      detecting a format of at least one of an analog TV signal and a digital TV signal comprising a television channel using only a subset of receive processing operations, wherein:
         a number of said receive processing operations is increased so as to decrease a probability of an incorrect detection; and
         a number of said receive processing operations is decreased so as to increase a speed of detecting television signal format.

2. The method according to claim 1, wherein said receive processing operations comprise one or more of the following:
   tuning to a channel comprising said received TV signal,
   detecting a signal power of said received TV signal,
   attempting to lock to a pilot tone comprising said received TV signal,
   attempting to lock to a carrier, fc, comprising said received TV signal,
   attempting to lock to a symbol timing of said received TV signal,
   attempting to equalize said received TV signal,
   attempting to lock to a DFS signal comprising said received TV signal,
   attempting to lock to a MPEG encoded bit-stream comprising said received TV signal, attempting to lock to an audio carrier, fa, comprising said received TV signal, attempting to lock to a video carrier, fv, comprising said received TV signal, attempting to lock to one or more horizontal sync pulses comprising said received TV signal, and attempting to lock to one or more vertical sync pulses comprising said received TV signal.

3. The method according to claim 1, wherein said format of said digital TV signal is one of: a QAM signal, and a VSB signal.

4. The method according to claim 3, comprising detecting a mode of said QAM signal.

5. The method according to claim 4, wherein said mode comprises one of: 4-QAM, 16QAM, 32QAM, 64QAM, 128QAM, 256QAM, 512QAM, 1024QAM, and 2048QAM.

6. The method according to claim 3, comprising detecting a mode of said VSB signal.

7. The method according to claim 6, wherein said mode comprises one of: 2-VSB, 4-VSB, 8-VSB, and 16VSB.

8. The method according to claim 1, wherein said format of said analog TV signal is one of: a NTSC signal, a PAL signal, SECAM.

9. The method according to claim 1, wherein said TV signals processing is deployed in a customer premise equipment (CPE).

10. The method according to claim 9, wherein said CPE comprises a TV set, a cable TV set-top box, a cable TV modem, a handheld audio visual device, a Personal Digital Assistance (PDA), a cell phone device.

11. A non-transitory computer-readable storage having stored thereon, a computer program having at least one code section for networking, the at least one code section being executable by a computer for causing the computer to perform steps comprising:

in a TV system that receives and processes TV signals, detecting a format of at leat one of an analog TV signal and a digital TV signal comprising a television channel using only a subset of receive processing operations, wherein:
  a number of said receive processing operations is increased so as to decrease a probability of an incorrect detection; and
  a number of said receive processing operations is decreased so as to increase a speed of detecting television signal format.

12. The non-transitory computer-readable storage according to claim 11, wherein said receive processing operations comprise one or more of the following:

tuning to a channel comprising said received TV signal, detecting a signal power of said received TV signal, attempting to lock to a pilot tone comprising said received TV signal, attempting to lock to a carrier, fc, comprising said received TV signal, attempting to lock to a symbol timing of said received TV signal, attempting to equalize said received TV signal, attempting to lock to a DFS signal comprising said received TV signal, attempting to lock to a MPEG encoded bit-stream comprising said received TV signal, attempting to lock to an audio carrier, fa, comprising said received TV signal, attempting to lock to a video carrier, fv, comprising said received TV signal, attempting to lock to one or more horizontal sync pulses comprising said received TV signal, and attempting to lock to one or more vertical sync pulses comprising said received TV signal.

13. The non-transitory computer-readable storage according to claim 11, wherein said format of said digital TV signal is one of: a QAM signal, and a VSB signal.

14. The non-transitory computer-readable storage according to claim 13, wherein said at least one code section enables detecting a mode of said QAM signal.

15. The non-transitory computer-readable storage according to claim 14, wherein said mode comprises one of: 4-QAM, 16QAM, 32QAM, 64QAM, 128QAM, 256QAM, 512QAM, 1024QAM, and 2048QAM.

16. The non-transitory computer-readable storage according to claim 13, wherein said at least one code section enables detecting a mode of said VSB signal.

17. The non-transitory computer-readable storage according to claim 16, wherein said mode comprises one of: 2-VSB, 4-VSB, 8-VSB, and 16VSB.

18. The non-transitory computer-readable storage according to claim 11, wherein said format of said analog TV signal is one of: a NTSC signal, a PAL signal, SECAM.

19. The non-transitory computer-readable storage according to claim 11, wherein said TV signals processing is deployed in a customer premise equipment (CPE).

20. The non-transitory computer-readable storage according to claim 19, wherein said CPE comprises a TV set, a cable TV set-top box, a cable TV modem, a handheld audio visual device, a Personal Digital Assistance (PDA), a cell phone device.

21. A system for processing TV signals, the system comprising:

one or more circuits for use in a TV system, said one or more circuits being operable to receive and process TV signals, said one or more circuits being operable to detect a format of at least one of an analog TV signal and a digital TV signal comprising a television channel using only a subset of receive processing operations, and wherein said one or more circuits are operable to one or both of:
  increase a number of said receive processing operations that are performed so as to decrease a probability of an incorrect detection; and
  decrease a number of said receive processing operations that are performed so as to increase a speed of detecting television signal format.

22. The system according to claim 21, wherein said receive processing operations comprise one or more of the following:

tuning to a channel comprising said received TV signal, detecting a signal power of said received TV signal, attempting to lock to a pilot tone comprising said received TV signal, attempting to lock to a carrier, fc, comprising said received TV signal, attempting to lock to a symbol timing of said received TV signal, attempting to equalize said received TV signal, attempting to lock to a DFS signal comprising said received TV signal, attempting to lock to a MPEG encoded bit-stream comprising said received TV signal, attempting to lock to an audio carrier, fa, comprising said received TV signal, attempting to lock to a video carrier, fv, comprising said received TV signal, attempting to lock to one or more horizontal sync pulses comprising said received TV signal, and attempting to lock to one or more vertical sync pulses comprising said received TV signal.

23. The system according to claim 21, wherein said format of said digital TV signal is one of: a QAM signal, and a VSB signal.

24. The system according to claim 23, wherein said one or more circuits enable detecting a mode of said QAM signal.

25. The system according to claim 24, wherein said mode comprises one of: 4-QAM, 16QAM, 32QAM, 64QAM, 128QAM, 256QAM, 512QAM, 1024QAM, and 2048QAM.

26. The system according to claim 23, wherein said one or more circuits enable detecting a mode of said VSB signal.

27. The system according to claim 26, wherein said mode comprises one of: b 2-VSB, 4-VSB, 8-VSB, and 16VSB.

28. The system according to claim 21, wherein said format of said analog TV signal is one of: a NTSC signal, a PAL signal, SECAM.

29. The system according to claim 21, wherein said TV signals processing is deployed in a customer premise equipment (CPE).

30. The system according to claim 29, wherein said CPE comprises a TV set, a cable TV set-top box, a cable TV modem, a handheld audio visual device, a Personal Digital Assistance (PDA), a cell phone device.

* * * * *

UNITED STATES PATENT AND TRADEMARK OFFICE
CERTIFICATE OF CORRECTION

PATENT NO. : 8,149,332 B2  
APPLICATION NO. : 11/746775  
DATED : April 3, 2012  
INVENTOR(S) : Singh et al.

Page 1 of 1

It is certified that error appears in the above-identified patent and that said Letters Patent is hereby corrected as shown below:

In the Claims

Column 13, line 38, Claim 11, please delete "leat" and replace with "least".

Signed and Sealed this  
Thirteenth Day of August, 2013

Teresa Stanek Rea  
*Acting Director of the United States Patent and Trademark Office*